United States Patent [19]

Jaisle et al.

[11] 4,263,073

[45] Apr. 21, 1981

[54] PROCESS FOR RELEASING LAMINATES

[75] Inventors: Richard F. Jaisle, Batesville, Ind.; Walter W. Schiermeier, Cincinnati, Ohio

[73] Assignee: Formica Corporation, Cincinnati, Ohio

[21] Appl. No.: 82,492

[22] Filed: Oct. 9, 1979

Related U.S. Application Data

[63] Continuation of Ser. No. 913,707, Jun. 8, 1978, abandoned.

[51] Int. Cl.$^3$ .................................... B32B 31/00
[52] U.S. Cl. ..................................... 156/90; 156/220; 156/222; 156/247; 156/278; 156/288; 156/289; 156/323; 162/135; 162/175; 427/380; 427/391; 427/419.8; 428/172; 428/202
[58] Field of Search .................. 156/289, 288, 247, 90, 156/220, 222, 242, 247, 277, 278, 288, 289, 323, 344; 428/164, 165, 163, 172, 202; 427/380, 382, 391, 414, 419.8; 162/135, 136, 132, 175

[56] References Cited

U.S. PATENT DOCUMENTS

| | | | |
|---|---|---|---|
| 2,587,171 | 2/1952 | Knewstubb et al. | 156/254 X |
| 3,215,579 | 11/1965 | Hagen | 156/289 |
| 4,035,218 | 7/1977 | Yount | 156/289 X |

OTHER PUBLICATIONS

Stephenson, Pulp and Paper Manufacture, Preparation of Stock for Paper Making, vol. 2, First Edition, McGraw, Hill Book Co., Inc., New York, pp. 328-329.

*Primary Examiner*—John T. Goolkasian
*Assistant Examiner*—Thomas Bokan
*Attorney, Agent, or Firm*—Frank M. Van Riet

[57] ABSTRACT

A novel method of releasing from one another in a press pack, a plurality of heat and pressure consolidated resin-impregnated laminates, including those pressed back-to-back, e.g. decorative laminates, metal clad laminates, veneer backs and the like, which method comprises utilizing, as a separator sheet, a web of phenol-formaldehyde resin-free paper having a water absorption of at least about 200 seconds which has been sized on at least one side thereof, from an aqueous solution, with a water-soluble, alkaline earth or earth metal salt, e.g. a calcium salt such as calcium chloride, and then coated on said sized side with a film of a salt of alginic acid, such as sodium alginate.

7 Claims, No Drawings

PROCESS FOR RELEASING LAMINATES

This is a continuation of application Ser. No. 913,707, filed June 8, 1978, now abandoned.

BACKGROUND OF THE INVENTION

When making laminates, it is conventional to utilize a plurality of resin-impregnated core sheets. The sheets employed for this purpose are usually prepared from cellulosic fibers, e.g. creped or uncreped kraft paper and the like. In common practice, the fibrous core sheet material, in the form of a continuous sheet is first impregnated with resin, usually a thermosetting synthetic resin and, more particularly, in the case of cellulosic core sheets, a thermosetting phenolic resin such as a phenol-formaldehyde resin, a cresolformaldehyde resin or the like. The resin-impregnated core sheet material is then dried to a desired volatile content and finally cut to the appropriate size.

Often times, laminates are prepared solely from a plurality of these resin-impregnated core sheets stacked in superimposed relationship, and the number of plies in the stack will depend on the use for which the laminate is intended. In most cases, however, one or more decorative overlayments are placed on top or on both top and bottom of such a core assembly prior to lamination.

Thus, for example, in preparing a conventional decorative laminating assembly, a print sheet, which usually comprises a single, resin-impregnated sheet of an absorbent high alpha-cellulose or regenerated cellulose paper or similar fibrous material bearing an ornamental design or dyed or pigmented to impart a solid color thereto, is placed on top of the core member, which in this case generally contains 5 to 8 plies. A protective overlay sheet, which is usually similar to the print sheet except for being undecorated, is then usually placed over the print sheet.

The resins used to impregnate the print and overlay sheets are generally thermosetting synthetic resins such as aminotriazine-aldehyde, e.g. melamine formaldehyde which do not develop any significant amount or undesirable discoloration when subjected to laminating temperatures.

Similarly, metal clad laminates are obtained from assemblies wherein a thin metal sheet or foil, e.g. a copper, an aluminum, a steel, and alloys such as brass is placed on top of the core member.

Laminating assemblies of this type may be individually laminated by application of heat and pressure thereto; however, for obvious economic reasons, it is common practice to consolidate a plurality of these individual laminating assemblies into one large assembly or press pack and then to laminate this pack in one operation.

Where individual laminating assemblies containing, besides the core member, overlayments such as those described above are concerned, and also where it is desired to obtain laminates having one major surface either smooth or textured and free of defects from a plurality of core sheets as the sole laminae, the press pack will be built from these individual laminating assemblies placed back-to-back.

In building such a pack, an individual laminating assembly is placed with its overlayment surface adjacent to a polished press plate. The core members are then placed on the overlayment and another individual laminating assembly is then positioned back-to-back with the first assembly, with a separator sheet being placed between the core members of the individual assemblies. Another polished press plate is placed on the second individual assembly adjacent to its overlayment surface. Thus, at this point, the pair of laminating assemblies can be considered as being in mirror image relationship between the press plates, separated only by the separator sheet.

In its simplest embodiment, a back-to-back press pack would consist of this arrangement of one pair of individual laminating assemblies between their core members. In actual commercial practice, however, the entire procedure is usually repeated many times, until a pack having the desired height has been built. The press pack is then subjected to heat and pressure by inserting it into a laminating press, to consolidate the individual laminating assemblies into unitary structures. When the press pack is removed from the laminating press, the resulting pairs of laminates, pressed back-to-back are removed from between the press plates and then separated from one another at the locus of the separator sheet.

As previously indicated, this multiple laminating method affords definite economic advantages. However, as practiced commercially at the present time, it also has certain inherent disadvantages. Foremost among these is the fact that in order to be truly effective, the required separator sheet must, in many cases, be prepared from relatively costly materials. A partial solution to this problem is described in U.S. Pat. No. 3,050,434 to Emily et al. which discloses a separator sheet comprising a web of paper coated with a film of a salt of alginic acid. It has been found that while such sheets may sometimes result in a satisfactory laminate release, more times than not the release will be unsatisfactory. The deficiency of such sheets results from the fact that the paper completely absorbs the alginic salt so that very little, if any, remains on their surface. Application of large amounts of alginic salt does not appear to improve the frequency of inferior releases.

A later advance in the art was made as described in U.S. Pat. No. 3,215,579 to Hagen. This patent discloses that a paper web, and particularly a saturating kraft paper web, can be inexpensively made into a separator sheet by first sizing the web with an aqueous solution of a water-soluble alkaline earth or earth metal salt and then coating the sized web on at least one side, i.e. with a film of a salt of alginic acid.

Although superior to the alginic salt alone, the sized release sheet also absorbs a great deal of sizing agent and alginic salt so that it, too, frequently results in an inferior release when used to separate decorative laminates undergoing consolidation. Large amounts of alginic salt, even applied in sequential layers does not improve these deficiencies. Only by incorporating a phenolic resin was Hagen able to produce a satisfactory release sheet. The use of such a resin, before sizing, is very costly.

SUMMARY OF THE INVENTION

It has now been discovered that an effective separator sheet for releasing laminates in a press pack from one another can inexpensively be made by first coating a paper web having a water absorption of at least 200 seconds with an aqueous solution of a water-soluble alkaline earth or earth metal salt, then coating the same surface with a film of a salt of alginic acid. The inventive concept hereof resides in the utilization of a paper having a water absorption such that as the salt sizing and alginate coatings are applied to the surface of the paper, substantially all of the coating is retained on the surface fibers thereof and substantially no penetration into the web occurs. Thus, there is obtained a thin, uniform, smooth release layer on top of the paper web thereby creating an effective, release separating sheet.

BACKGROUND OF THE INVENTION INCLUDING PREFERRED EMBODIMENTS

According to the instant invention, there is disclosed a method of releasing laminates from one another in a heat and pressure consolidated press pack which comprises (1) arranging a plurality of thermosetting synthetic resin-impregnated fibrous core sheets in superimposed relationship in groups of at least two stacks, (2) separating said stacks from one another with a separator sheet comprising a web of phenol-formaldehyde resin-free paper having a water absorption of at least about 200 seconds, at least one side of which has been sized with a water-soluble salt of an alkaline earth metal or earth metal in an amount sufficient to provide a solids content of said salt distributed throughout the sized surface of said web ranging from about 0.001% to about 10%, by weight, based on the dry weight of the sized web, and then coated on its sized side with a film of a salt of alginicacid, (3) consolidating said stacks of core sheets by the application of heat and pressure thereto and, (4) separating the resulting laminates from one another at the locus of said separator sheet.

Among the more common of the alkaline earth metals and earth metals from which the salts used in the practice of the present invention are derived are magnesium, calcium, strontium, barium and aluminum. A wide variety of salts of the alkaline earth and earth metals may be employed and, in fact, any salt or mixture of salts which is sufficiently soluble in water to provide a solution which, in turn, will be sufficiently concentrated to permit sizing of the paper web with the necessary amount of alkaline earth or earth metal salt can be used. A partial listing of such salts is exemplified by the calcium salts, including calcium chloride, calcium bromide, calcium iodide, calcium acetate, calcium bromate, calcium ferricyanide, calcium nitrate, calcium thiocyanate and the like. Magnesium, potassium, sodium, lithium, barium etc. can also be used to form such salts.

The paper which is used in the practice of this invention is a corrugating medium kraft paper (made from reclaimed pulp) having a water absorption of at least about 200 seconds, preferably from about 400 to about 1600 seconds, as determined by TAPPI Method T492-SM-60; 1960. This paper, which is well known to those skilled in the paper-making industry, is generally utilized to produce corrugated boxes, separators etc. having good water-resistance. It is phenol-formaldehyde resin free and is rendered of low water-absorbability by treatment with chemicals i.e. interior sizes, or possesses the low water-absorbability, as prepared, due to the fibers used for its production.

A preferred method of preparing a separator sheet to be used in the practice of the process of the present invention involves first sizing the above-described paper web with an aqueous solution of one of the aforementioned alkaline earth or earth metals salts; using such methods as dipping, roll coating, spraying, gravure printing cylinder and the like, in one or several passes to give a solids content of the salt distributed on the surface of the paper of from about 0.001% to about 10%, by weight, and preferably from about 0.01% to about 0.1%, by weight, based on the dry weight of this sized paper. One or, preferably, both sides of the paper can be sized by this method.

Following the sizing treatment, the paper web is preferably dried to a low moisture content, e.g., less than about 8%, by weight, based on the dry weight of the paper, and then coated, e.g., by dipping, spraying, reverse roll or, preferably, with a gravure printing cylinder on the sized side or sides with an alginate salt film. However, the wet, alkaline earth or earth metal salt-sized paper web need not be dried prior to being coated with the alginate salt film as long as it is not alginate coated by dipping or passing it through a bath containing the alginate salt because passing a wet, sized paper web through an alginate salt bath will usually cause the alginate salt to coagulate. Where the sized web is not dried before being coated with the alginate salt, coating can be accomplished by such methods as spraying, knife coating, gravure and the like.

Whether the sized paper is wet or dry, the dried alginate salt film applied thereto will be at least 0.5 lbs. per ream and preferably 0.6-0.8 lbs. per ream. Among the alginates which can be employed are lithium alginate, sodium alginate, potassium alginate, iron alginate, ammonium alginate and the like, as well as mixtures thereof. These alginates are readily available commercially and come in a plurality of forms, most being aqueous solutions having viscosities which will vary significantly with the concentration of alginate solids therein. In practicing the present invention, about 1-7% aqueous alginate salt solutions having viscosities ranging from about 5 centipoises to about 1000 centipoises at 25° C. are suitable.

After being coated with the alginate salt film, the paper web is dried, preferably at elevated temperatures using a forced hot air drying over, infrared heating means, or the like, to a desired moisture content, e.g., a moisture content of less than about 8%, by weight, based on the total weight of the dried paper. The paper is then ready for use as a separator sheet.

Where the separator sheet is coated on only one side with the film of alginate salt, it will become an integral part of one of the laminates which it separates. On the other hand, where the separator sheet is coated on both sides with an alginate salt film, it will be removed from between the finished laminates and recovered as such.

If desired, a pair of sheets coated on one side only with the alginate salt film rather than a single sheet can be used in separating laminating assemblies and releasing the individual laminates. In using such a pair of sheets, their alginate-coated surfaces will be positioned face-to-face in direct contact with one another. Thus, upon separation of the pair of laminates, the respective separator sheets will remain an integral part of the laminates to which they adhere on their uncoated sides.

The backs of laminates separated by means of the novel process described herein can be smoothed down, e.g., by sanding, particularly where the back of the laminate is coated with the alginate salt film.

In order that those skilled in the art may more fully understand the inventive concept presented herein, the following examples are set forth. These examples are given solely by way of illustration and should not be considered as expressing limitations unless so set forth in the appended claims. All parts and percentages are by weight unless otherwise stated.

EXAMPLE 1A

A continuous roll of a commercially available 78 lb. basis weight (3,000 sq. ft. ream) corrugating medium kraft paper free of phenol-formaldehyde resin and having a water absorption of 400 seconds (as determined by T-462-SM-60; TAPPI) is fed at 175 ft./min. through and in contact with a series of rotogravure cylinders of a conventional multi-station gravure printing machine. At the first printing station, a 10% aqueous calcium chloride solution is applied to the surface of the paper by means of a quadrangular cell cylinder having 110 lines/inch which is uniformily etched to an average depth of about 0.0046 inch. The web is then immediately passed through a dryer for the removal of solvent and thereafter through a second printing station. A 2.0% sodium alginate solution is applied on top of the salt sizing by means of a quadrangular cell cylinder having 35 lines/inch which is etched to an average depth of 0.008 inch. The alginate precipitates on contact with the salt and forms a uniform, shiny coating of about 0.75 lbs./3,000 sq. ft. (dry basis). The web is then dried to a moisture content of 6% volatile and cut to size.

EXAMPLE 1B

A laminating assembly is prepared by stacking, in superimposed relationship, a commercially available melamine-formaldehyde resin-impregnated alpha-cellulose overlay sheet, a commercially available melamine-formaldehyde resin-impregnated cellulosic print sheet bearing a wood print design and seven sheets of standard phenolic resin-impregnated core stock.

A second, identical assembly is prepared in the same manner. Then, the separator sheet, prepared as described in Example 1, with its alginate-coated side facing out, is positioned below the last core sheet in each of the two laminating assemblies. The two assemblies are then placed together so that the alginate-coated sides of their respective separator sheets face one another. Polished press plates are placed next to the overlay sheet member of each laminate to sandwich the pair of back-to-back assemblies between the press plates and the entire assembly is then inserted into a laminating press and consolidated at a temperature ranging from 135° C. to 142° C. under a pressure of 1400 lbs./in.$^2$ for 20 minutes. Following lamination, the back-to-back laminating assemblies are cooled to room temperature and removed from the press. The two laminates are easily separated at the locus of the separator sheets.

EXAMPLE 2

(Comparative)

The corrugating medium of Example 1 is replaced by standard, commercially available saturated grade kraft paper, free of phenol-formaldehyde resin and having a water absorption of 3–5 seconds. Sodium alginate is applied to the sized side of the paper to form a coating of 0.55 lbs./3000 sq. ft. (dry basis). When the resultant sheet is used as a release sheet, an unsatisfactory release of the laminates results.

EXAMPLE 3

(Comparative)

The procedure of Example 2 is again followed except that a second layer of sodium alginate is applied after the first is applied and dried. The alginate coatings weighed about 2.0 lbs./3000 sq. ft. (dry basis). Again, an unsatisfactory release of the laminates resulted.

EXAMPLE 4

(Comparative)

The procedure of Example 2 is again followed except that the kraft paper is impregnated to a 28% resin level with a phenol/formaldehyde resin. The resultant sheet is then sized with calcium chloride, treated again with said phenol/formaldehyde resin and then the sized side is coated with sodium alginate. The alginate coating is of about 0.43 lbs./3000 sq. ft. (dry basis). The resultant sheet provides satisfactory release of the laminates.

EXAMPLE 5

(Comparative)

The procedure of Example 4 is again followed except that the kraft paper has a water absorption of about 210 seconds. The phenol/formaldehyde resin impregnated paper is sized with calcium chloride and then coated with sodium alginate on the sized side. No phenol resin is added between sizing and coating with alginate. An alginate coating of 0.511 lbs./3000 sq. ft. is formed. Again, a satisfactory release is obtained when using the resultant paper as a release sheet in the production of decorative laminates.

EXAMPLE 6–9

The procedure of Example 1 is again followed except that the calcium chloride is replaced by (6) calcium bromate, (7) calcium acetate, (8) magnesium chloride and (9) aluminum sulfate. In each instance, a release sheet of satisfactory releasing ability is recovered.

Example 10

Replacing the sodium alginate in Example 1 with potassium alginate, also results in satisfactory release of the decorative laminates.

EXAMPLE 11

The procedure of Example 1 is again followed except that only one sheet of corrugating medium is used, both of its sides being sized and coated as described. When placed between the laminate assemblies (in back-to-back, front-to-front or back-to-front relationship) satisfactory release is achieved.

We claim:

1. A method of releasing laminates from one another in a heat and pressure consolidated press pack which comprises
   (1) arranging a plurality of thermosetting synthetic resin-impregnated fibrous core sheets in superimposed relationship in groups of at least two stacks,
   (2) separating each of said two stacks from one another with a pair of separator sheets, each separator sheet comprising a web of phenol-formaldehyde resin-free paper having a water absorption of at least about 200 seconds, only one side of which has been sized with a water-soluble salt of an alkaline earth metal or earth metal in an amount sufficient to provide a solids content of said salt distributed throughout the sized surface of said web ranging from about 0.001% to about 10%, by weight, based on the dry weight of the sized web, and then coated on its sized side with at least 0.5 lbs. per ream of a film of a salt of alginic acid, the alginic acid salt coated side of each of said separator sheets in said pair facing one another, (3) consolidating said stacks of core sheets and said separator sheets by the application of heat and pressure thereto and, (4) separating the resulting laminates from one another at the locus of said alginic acid salt coated sides of said separator sheets, the bottommost surface of each resulting laminate constituting one of said separator sheets.

2. A method according to claim 1 wherein said water-soluble salt is a salt of an alkaline earth metal.

3. A method according to claim 1 wherein said water-soluble salt is a salt of an earth metal.

4. A method according to claim 1 wherein said water-soluble salt is a salt of calcium.

5. A method according to claim 1 wherein said salt of alginic acid is sodium alginate.

6. A method according to claim 1 wherein said water-soluble salt is a salt of calcium and said salt of alginic acid is sodium alginate.

7. A method according to claim 1 wherein said paper is corrugating medium kraft.

* * * * *